UNITED STATES PATENT OFFICE.

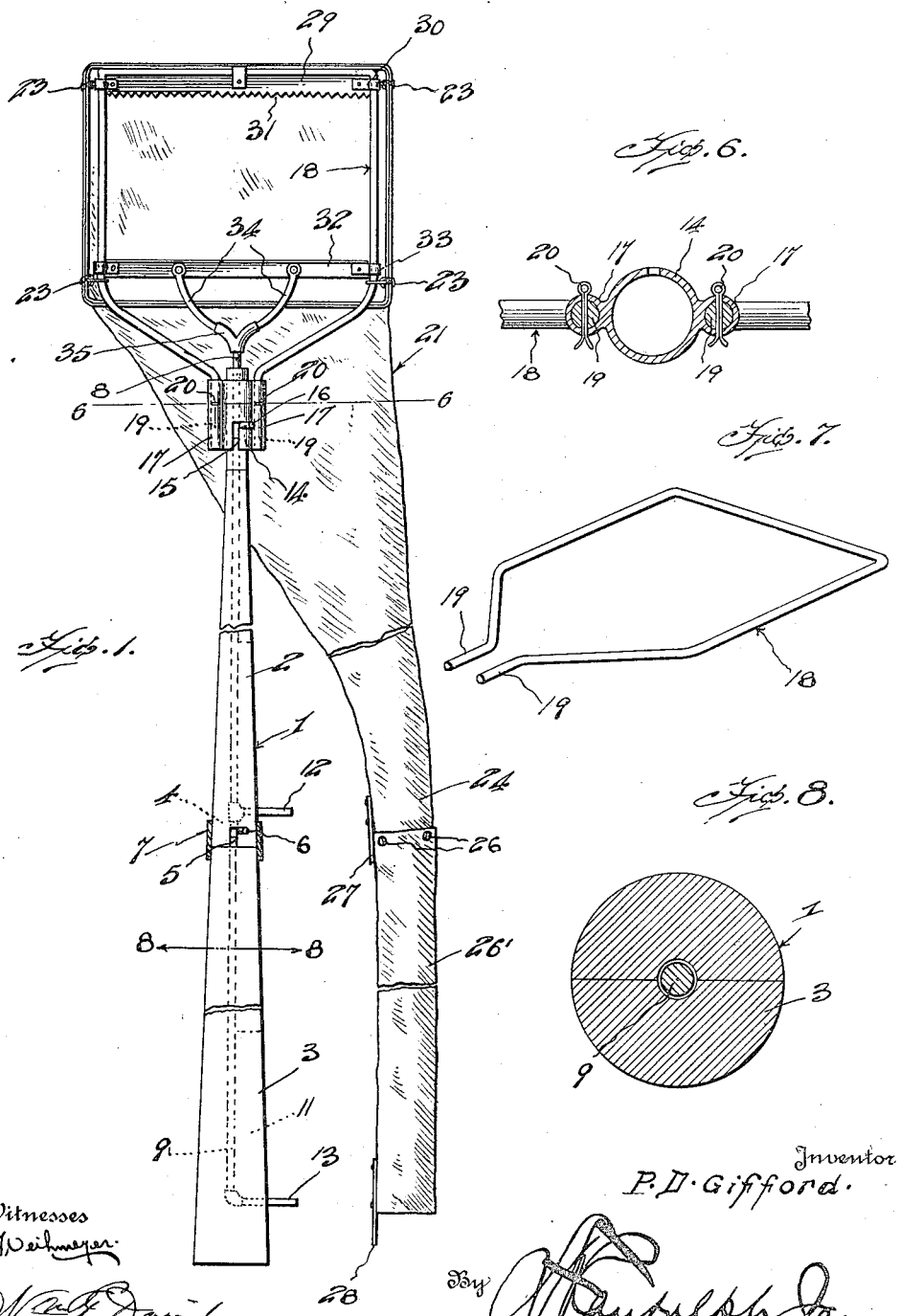

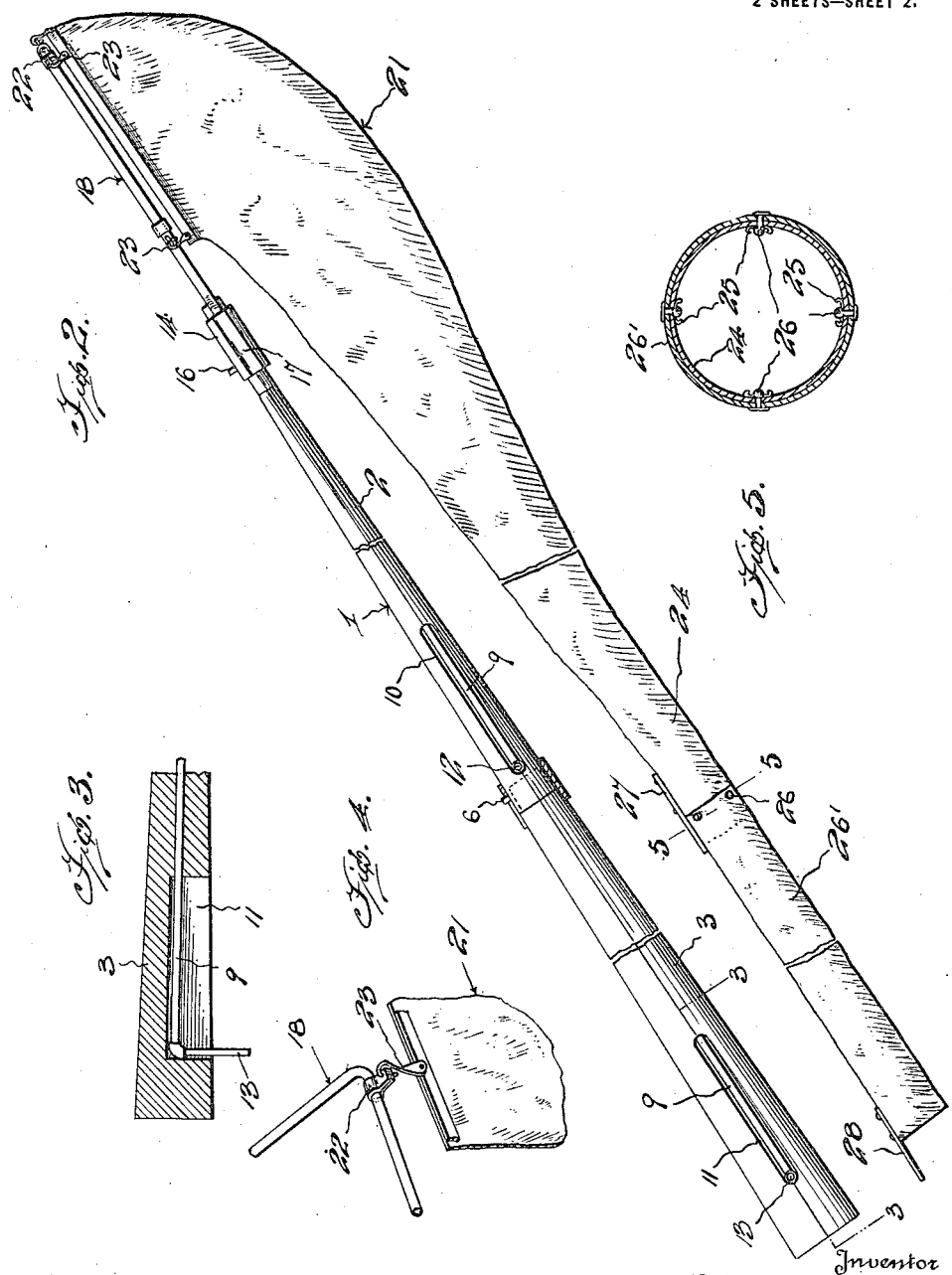

PERRY D. GIFFORD, OF WINDFALL, INDIANA.

FRUIT-PICKER.

1,214,450.

Specification of Letters Patent.

Patented Jan. 30, 1917.

Application filed February 11, 1916. Serial No. 77,780.

*To all whom it may concern:*

Be it known that I, PERRY D. GIFFORD, a citizen of the United States, residing at Windfall, in the county of Tipton and State of Indiana, have invented certain new and useful Improvements in Fruit-Pickers; and I do hereby declare the following to be a full, clear, and exact description of the invention, such as will enable others skilled in the art to which it appertains to make and use the same.

This invention relates to new and useful improvements in a fruit picker and one of its objects is the provision of a device of this character which will be simple, durable and efficient, and which may be manufactured and sold at a comparatively low cost.

Another object of this invention is to provide a cutting device, for cutting stems of fruit and allowing the fruit to fall into a chute, which will convey the fruit down to the operator and will retard the speed of the fall so that the fruit will not become bruised or mutilated.

A further object of this invention is to provide a frame secured to the end of a sectional pole, for supporting one end of the chute and to slidably support the cutting device so that the stems of the fruit are cut and will direct the fruit into the mouth or top end of the chute.

A further object of this invention is to provide a plate, supported by the frame and having two teeth to catch and hold the stems of the fruit, whereby the cutting device may be operated to slide on the frame in the direction of the plate to cut the stems and force the fruit to fall into the chute.

A still further object of this invention is to provide a hand operating rod slidable within the pole and connected to the cutting device for moving the cutting device upwardly and downwardly upon the frame.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which:—

Figure 1 is a front elevation of a fruit picker, constructed in accordance with my invention, Fig. 2 is a side elevation of the device, Fig. 3 is a vertical sectional view of a portion of the pole, taken on the line 3—3 of Fig. 2, Fig. 4 is a detail view, illustrating the connection between the chute and the frame, Fig. 5 is a longitudinal sectional view taken on the line 5—5 of Fig. 2, Fig. 6 is a longitudinal sectional view taken on the line 6—6 of Fig. 1, Fig. 7 is a perspective view of the frame removed from the pole and chute, and Fig. 8 is a longitudinal sectional view taken on the line 8—8 of Fig. 1.

Referring in detail to the drawings, the numeral 1 indicates a pole, constructed of upper and lower sections 2 and 3. The upper section 2 is recessed in the lower end to receive a reduced end 4 formed on the upper end of the lower section 3. The upper section 2 is provided with a bayonet slot 5 to receive a pin 6 carried by the reduced end 4 of the lower section 3, to firmly and detachably secure the sections 2 and 3 together. A metal ferrule 7 may be secured to the lower end of the section 2, to receive a portion of the lower section 3, to reinforce the joint between the sections. The metal ferrule 7, has a bayonet slot to coöperate with the bayonet slot 5 of the upper section 2. If desired another section may be added to the pole 1, by connecting it between the sections 2 and 3 in the manner described, for connecting the sections 2 and 3 together. The sections 2 and 3 are provided with a central bore, which receives operating rods 8 and 9. The sides of the sections 2 and 3 are provided with slots 10 and 11 which communicate with the central bore of the sections 2 and 3. A pair of handles 12 and 13 extend through the slots 10 and 11 and are detachably secured to the lower ends of the operating rods 8 and 9 for sliding the rods upwardly and downwardly within the sections 2 and 3.

A cylindrical collar 14 is secured to the upper end of the section 2 and provided with a bayonet slot 15 to receive a pin 16 carried by the upper end of the section 2. A pair of cylindrical barrels 17 are formed integral upon each side of the collar 14 to receive the ends of a frame 18. The frame 18 is constructed of a continuous piece of metal and is provided with its ends 19 bent inwardly and parallel with each other to be inserted within the barrels 17. Cotter pins 20 pass through the barrels 17 and the ends 19 of the frame 18, to prevent the frame 18 from accidentally disengaging from the barrels 17.

Secured to the frame 18 is a chute 21 constructed of canvas or other suitable material, by means of suitable clips 22 receiving hooks 23 secured to the edges of the chute 21. The chute 21 decreases in size at its lower end as illustrated at 24 and has a plurality of eyelets 25 secured thereto, which receive studs 26 carried by a lower section 26'. Secured to the end of the chute 21 is a strap 27 and a similar strap 28 is secured to the lower end of the lower section 26'. The straps provide efficient handles for holding the lower end of the chute 21 and section 26' upwardly to prevent fruit from falling therefrom.

A plate 29 is secured to the frame 18 by means of clips 30 and is provided with teeth 31 to receive the stems of fruit and hold the fruit directly over the mouth of the chute 21. A cutting bar 32 having a sharpened edge is slidably secured to the frame 18 by the clips 33. A pair of arms 34 are secured to the cutting bar 32 and are secured to a coupling 35, which is secured to the end of the operating rod 8. When the operating rods are moved upwardly the cutting bar 32 is caused to slide upwardly and cut the stems of the fruit held by the teeth 31 of the plate 29.

In operation the lower section 3 is gripped in one hand and the strap 28 is also gripped in the same hand and placing the stem of the fruit to be clipped between the teeth 31, the handle 13 is moved upwardly with the other hand, causing the cutting bar 32 to move in the direction of the teeth 31 and slide over the plate 29 causing a shearing action thus cutting the stem held by them and forcing the fruit to fall into the chute 21. When picking fruit from small trees, the lower section 3 of the pole 1 and also the section 26' of the chute is removed. The operation then is identical with the foregoing described operation. The operator holding the section 2 of the pole 1 and the strap 27 in the one hand, with the other hand pushes upwardly the handle 12 to cause the cutting bar 32 to slide in the direction of the plate 29.

While I have shown and described the preferred embodiment of my invention, it will be understood that minor changes in construction, combination and arrangement of parts may be made without departing from the spirit and scope of the invention as claimed.

Having thus described my invention, what I claim is:—

A fruit picker comprising a cylindrical collar, a pair of oppositely disposed barrels formed on said collar and extending parallel therewith, a hollow handle secured within the collar, a substantially rectangular frame having its ends diverging inwardly and downwardly into the barrels, a serrated plate secured to the frame, teeth formed on the plate, a cutting blade slidably secured to the frame, a substantially U-shaped member secured to the blade, and an operating rod slidable in the handle and connected to said member for sliding said blade over the plate to sever the stems of fruit.

In testimony whereof I affix my signature in presence of two witnesses.

PERRY D. GIFFORD.

Witnesses:
A. H. HOYER,
C. L. PREESONG.

Copies of this patent may be obtained for five cents each, by addressing the "Commissioner of Patents, Washington, D. C."